(12) United States Patent
Zaitsev et al.

(10) Patent No.: US 10,222,867 B2
(45) Date of Patent: Mar. 5, 2019

(54) CONTINUED PRESENTATION OF AREA OF FOCUS WHILE CONTENT LOADS

(71) Applicant: Lenovo (Singapore) Pte. Ltd., New Tech Park (SG)

(72) Inventors: Grigori Zaitsev, Durham, NC (US); Russell Speight VanBlon, Raleigh, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 678 days.

(21) Appl. No.: 14/710,177

(22) Filed: May 12, 2015

(65) Prior Publication Data

US 2016/0334977 A1    Nov. 17, 2016

(51) Int. Cl.
| G06F 3/048 | (2013.01) |
| G06F 3/01 | (2006.01) |
| G06F 3/00 | (2006.01) |
| G06F 3/0481 | (2013.01) |
| G06F 3/0485 | (2013.01) |
| G06F 9/451 | (2018.01) |
| G06F 3/0488 | (2013.01) |

(52) U.S. Cl.
CPC .............. G06F 3/017 (2013.01); G06F 3/005 (2013.01); G06F 3/013 (2013.01); G06F 3/0485 (2013.01); G06F 3/0488 (2013.01); G06F 3/04812 (2013.01); G06F 9/451 (2018.02); G06F 9/452 (2018.02)

(58) Field of Classification Search
None
See application file for complete search history.

(56) References Cited

U.S. PATENT DOCUMENTS

| 5,886,683 | A * | 3/1999 | Tognazzini | G06F 3/013 345/156 |
| 7,747,749 | B1 * | 6/2010 | Erikson | G06F 17/30902 709/219 |
| 2006/0274083 | A1 * | 12/2006 | Makela | G06F 17/30905 345/619 |
| 2007/0183749 | A1 * | 8/2007 | Yamada | G11B 19/022 386/230 |
| 2007/0186182 | A1 * | 8/2007 | Schiller | G06F 17/30899 715/781 |
| 2008/0046562 | A1 * | 2/2008 | Butler | G06F 3/0489 709/224 |
| 2011/0102570 | A1 * | 5/2011 | Wilf | G06F 3/017 348/77 |
| 2011/0145688 | A1 * | 6/2011 | Han | H04M 1/72561 715/206 |

* cited by examiner

*Primary Examiner* — Justin S Lee
(74) *Attorney, Agent, or Firm* — John L. Rogitz; John M. Rogitz (57) ABSTRACT

In one aspect, a device includes a processor, a display accessible to the processor, and storage accessible to the processor. The storage bears instructions executable by the processor to identify an area of focus on a user interface (UI) presented on the display while content for the UI is loading, where at least a portion of the UI that comprises the area of focus is presented on the display at a first position while the content is loading. The instructions are also executable to, in response to the identification, control the display to present the area of focus on the display at least substantially at the first position as the content continues to load.

21 Claims, 5 Drawing Sheets

CONTINUED PRESENTATION OF AREA OF FOCUS WHILE CONTENT LOADS

FIELD

The present application relates generally to continued presentation of an area of focus while content loads.

BACKGROUND

When downloading content for a web page, some of the content is often presented prior to all content for the web page being downloaded. Sometimes user begins to view a portion of the con during this period. However, the web page can "jump" around and/or have its content re-rendered as more content continues to be downloaded. As recognized herein, this "jumping" can be frustrating to the user because the portion he or she was viewing is often moved from where it was presented when they started looking at it as the web page continues to download and must be searched for to continue viewing it after this happens.

SUMMARY

Accordingly, in one aspect a device includes a processor, a display accessible to the processor, and storage accessible to the processor. The storage bears instructions executable by the processor to identify an area of focus on a user interface (UI) presented on the display while content for the UI is loading, where at least a portion of the UI that comprises the area of focus is presented on the display at first position while the content is loading. The instructions are also executable to, in response to the identification, control the display to present the area of focus on the display at least substantially at the first position as the content continues to load.

In another aspect, a method includes identifying, while content for a window is being accessed, a portion of the window for observation by a user, where the portion of the window is presented on a display. The method also includes, based at least in part on the identifying, continuing to present the portion on the display as the content continues to be accessed.

In still another aspect, a computer readable storage medium that is not a transitory signal comprises instructions executable by a processor to, while content is being accessed, for presentation on a user interface (UI) that is presented on a display, determine an area of the UI presented on the display that is being viewed. The instructions are also executable to, at least in part based on the determination, present the area at least subsequent to the content being accessed.

The details of present principles, both as to their structure and operation, can best be understood in reference to the accompanying drawings, in which like reference numerals refer to like parts, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
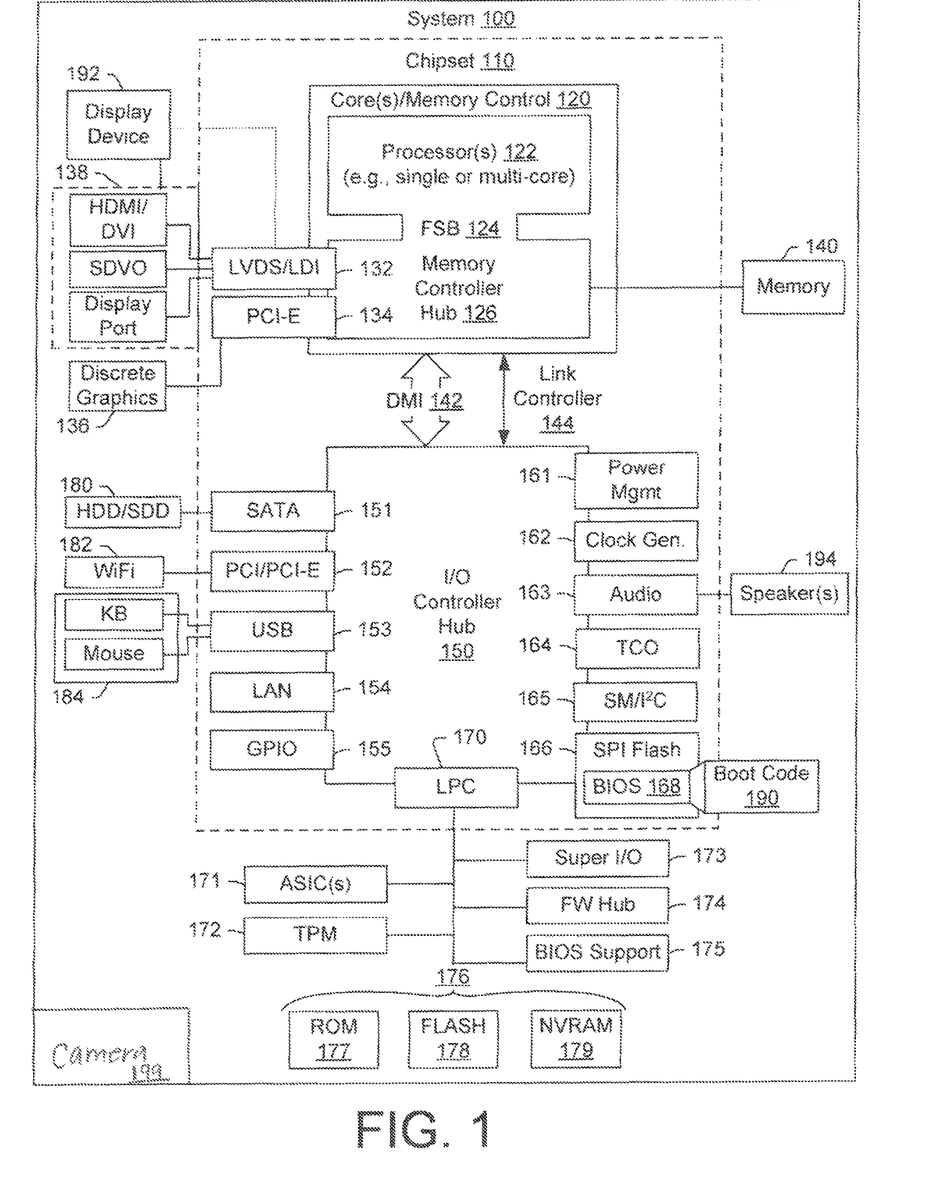
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc, of Morrisville, N.C.; however, as apparent from the description herein, a client device, a server or other machine in accordance with present principles may include other features or only some of the features of the system 100. Also, the system 100 may be, e.g., a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has is particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller huh 126 interfaces with memory 140. For example, the mentor controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192. (e.g., a CRT, a flat panel, a projector, a touch-enabled display, etc.), A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interlace 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.)

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include a camera 199 for gathering one more images and providing input related thereto to the processor 122 in accordance with present principles. The camera may be a thermal imaging camera, a digital camera such as a webcam, a three-dimensional (3D) camera, and/or a camera integrated into the system 100 and controllable by the processor 122 to gather pictures/images and/or video.

Additionally, though now shown for clarity, in some embodiments the system 100 may include a gyroscope for sensing and/or measuring the orientation of the system 100 and providing input related thereto to the processor 122, an accelerometer for sensing acceleration and/or movement of the system 100 and providing input related thereto to the processor 122, and an audio receiver/microphone providing input to the processor 122 based on, e.g., a user providing audible input to the microphone. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

Figure 2:
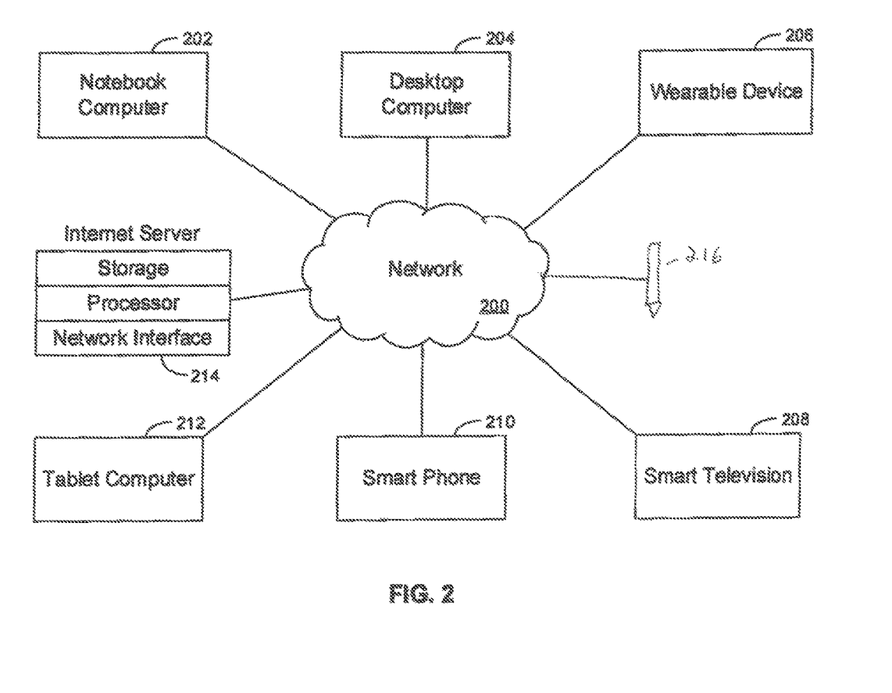
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over network 200 such as the Internet in accordance with present principles. It is to be understood that each of the devices described in reference to FIG. 2 may include at least some of the features, components, and/or elements of the system 100 described above. In any case, FIG. 2 shows a notebook computer 202, a desktop computer 204, a wearable device 206 such as a smart watch, a smart television (TV) 208, a smart phone 210, a tablet computer 212, a stylus 216, and a server 214 such as an Internet server that may provide cloud storage accessible to the devices 202-212 and 216. It is to be understood that the devices 202-216 are configured to communicate with each other over the network 200 to undertake present principles.

Figure 3:
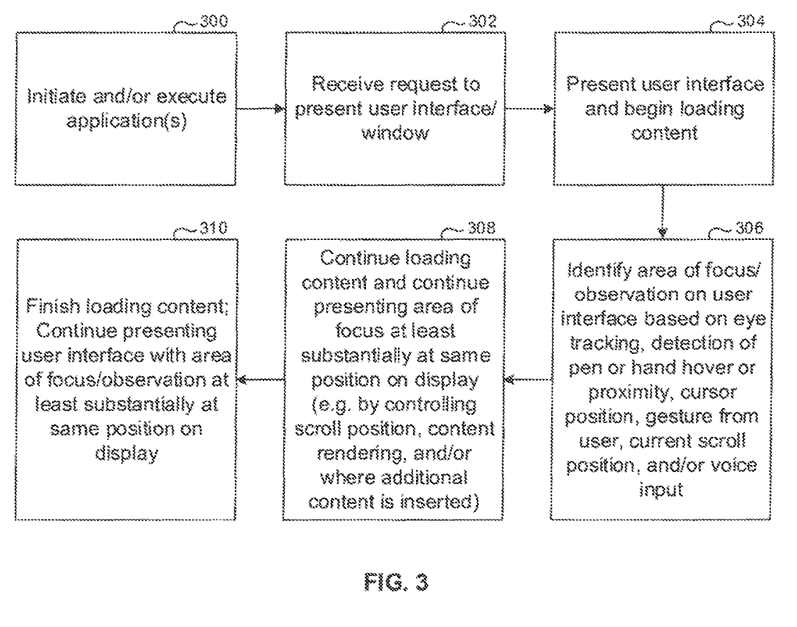
FIG. 3 is a flow chart showing an example algorithm in accordance with present principles.

Referring to FIG. 1, it shows example logic that may be undertaken by a device such as the system 100 in accordance with present principles (referred to below as the "present device"). Beginning at block 300, the logic initiates and/or executes one or more applications for undertaking present principles, such as a focus tracking application, an eye tracking application, an object recognition application, a gesture recognition application, a stylus and/or human proximity detection application, a voice detection application, and/or an combination of the foregoing applications. From block 300 the logic proceeds to block 302.

At block 302 the logic receives a request to present a user interface (UI), another type of interface, a window, a dialog screen, a content screen, etc., which will be referred to below simply as "the UI" for simplicity. The logic then moves to block 304 where it presents the UI and begins loading, acquiring, and/or accessing content for presentation thereon. For example, if the UI were an Internet browser, the present device may receive a request to initiate the browser at block 302, and may then present the browser and automatically start downloading content from a web page designated as a home page for the browser at block 304.

From block 304 the logic proceeds to block 306 where the logic identifies an area of focus and/or observation of the UI by a user, such as particular text or a particular selector element (e.g., an icon, hypertext, a link, etc.) presented on the UI. The identification at block 306 may be based on execution of eye tracking software using input from a camera accessible to the present device to identify an item on the UI and/or an area on the UI toward which the user is looking and/or at which the user is focusing. The identification at block 306 may additionally or instead be based on execution of gesture and/or object recognition software using input from the camera (e.g. a three dimensional camera) to identify an item on the UI and/or an area on the UI at which the user is gesturing and/or pointing such as with one of their fingers.

Further, the identification at block 306 may additionally or instead be based on execution of voice input software using input from a microphone accessible to the present device to identify an item and/or area being focused on based on received voice input and/or detected audio. For example, an area of focus may be identified based on key words spoken by the user that are detected and that are identified as corresponding to words, images, or links presented at the item/area (e.g., identifying at least one spoken word as also being a presented at the item/area, and/or identifying spoken words as being related to those actually presented on the item/area such as identifying a spoken synonym to a word presented on the item and/or area).

Even further, the identification at block 306 may additionally or instead be based on execution of proximity detection software and/or hover detection software using input from a camera and/or the device's display (e.g., where the display is configured for detecting hovers of an input device such as a stylus and/or for detecting hovers of a user over the display) to identify an item and/or area as corresponding to a location and/or area of the display to which a portion of the user (e.g., a finger) is proximate and/or hovering. For example, if the user were hovering a stylus over a particular paragraph of text presented on the display, the location of the display under the stylus may be identified and hence the paragraph of text presented thereat may be identified as the area of focus. As another example, if the user were to place then finger just to the side of the display next to a line of text presented on the display, the user's finger may be detected as being proximate to that particular line of text and that line of text may therefore be identified as the area of focus.

Also in addition to or in lieu of the foregoing, the identification at block 306 may be based on based on identification of a position of a cursor that is presented on the display to identify an item and/or area at the cursor position, and/or based on a current position of a scroll controller on a scroll bar to identify at least an area of the UI that was scrolled to and presented on the display as being an area of focus and/or observation.

After block 306, the logic of FIG. 3 moves to block 308. At block 308 the logic continues loading, acquiring, and/or accessing content for presentation on the UI, and/or the logic shifts and/or moves content presented on the UI (e.g., based on user input to a "twisty" to expand or contract an area of the UI, based on advertisements presented on the UI which enlarge or shrink, based on a reloading of the content, etc.). While doing so at block 308, the logic continues to present the area of focus and/or observation at least substantially at the same position on the display based on the identification(s) made at block 306. The logic may continue to present the area of focus and/or observation at block 308 once it is identified at block 306 by, e.g., controlling the scroll position (e.g., both horizontal and vertical scroll positions) of the content shown on the UI as it continues to load so that the area of focus and/or observation continues to be presented at least substantially at the same position on the display. For example, even if additional content is loaded that is to be juxtaposed above the area of focus and/or observation, that additional content may in fact be loaded above the area of focus without the UI "jumping" back to the top-most portion of the content and the present device may instead manage the scroll position of the UI so that the content is loaded above area of focus and/or observation but not presented on the display so that the area of focus and/or observation may continue to be presented at least substantially at the same position on the UI.

Before moving on to describe what occurs when the logic moves from block 308 to block 310, it is to be understood in light of what was disclosed above that in some embodiments, at least substantially at the same position on the display may be within a threshold number of pixels of the entire area of focus being presented at the first position (e.g., based on the format of the content being focused on and/or the format of the content still being loaded such as images, etc.) such that, for example, at least a portion of content from the area of focus is still presented at least at a portion of the display location initially identified as presenting the area of focus as the content continues to load. In other embodiments, at least substantially at the same position may also include the area of focus being presented specifically and/or only at the same position, while in still other embodiments the term may mean being presented such that at least a portion of the content from the area of focus remains presented at least at a portion of the location of the display initially identified as presenting the area of focus even if another portion of that content protrudes into an adjacent location on the display not initially identified as presenting the area of focus but which is adjacent thereto.

Now describing block 310 of FIG. 3, at this block the content may finish leading, accessing, and/or acquiring the content for the UI, and/or at this block the content stops shifting and/or moving. Also at block 310, the logic may continue presenting the UI with the area of focus and/or observation itself continuing to be presented at least substantially at the same position as disclosed herein.

Figure 4:
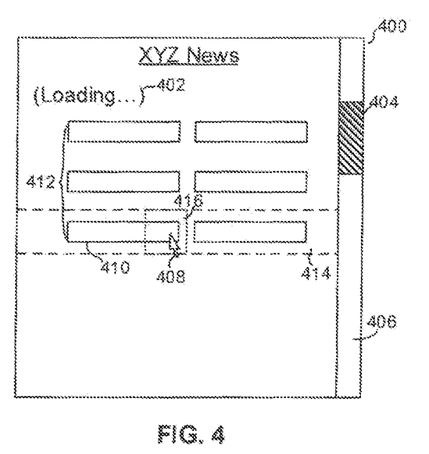
FIGS. 4-8 show example user interfaces (UIs) in accordance with present principles.

Continuing the detailed description in reference to FIGS. 4-7, they show an example Internet browser user interface (UI) 400 presentable on a display of a device in accordance with present principles. It is to be understood that the UI may be presented responsive to user input to present it and/or to launch an Internet browser application associated with the UI 400. Thus, FIG. 4 shows the UI 400 being presented with some content that has already been downloaded from a website, XYZ News, while additional content downloads from the website and/or continues to load. The website XYZ News may have requested by the user and/or may be the home site for the Internet browser application that is presented in response to launch of the Internet browser application.

In any case, it may be appreciated from FIG. 4 that an indication 402 is provided that content is in the process of being loaded at the location of the indication 402. It may also be appreciated from FIG. 4 that scroll controller 404 on a vertical scroll bar 406 has been moved by a user from a top-most position on the scroll bar 406 to the position shown to thus cause the web page to scroll down to present what is shown in FIG. 4. Also note that a cursor 408 has been moved by a user (e.g., but controlling a mouse or stylus, and/or by providing touch-based input) to be juxtaposed at least over a selector element 410 of the plural selector elements 412 shown, which may be selectable links, icons, hypertext, etc.

Regardless, the device may identify an area of focus to keep presenting it at the same display location as the content continues to load in the present example based on one or both of the current scroll position and the location of the cursor 408 as presented on the display. Thus, two example areas of focus 414 and 416 are shown on FIG. 4 which may be respectively identified based on the current scroll position and the location of the cursor 408. Area of focus 414 is represented by a perforated box for illustration but is understood to not actually be presented on the display, and area of focus 416 is similarly illustrated but also understood to not actually be presented on the display (although in other embodiments, these perforated boxes may be presented to provide an indication to the user of what the device identifies as the area(s) of focus).

First describing the area of focus 414, it may be identified based on the current scroll position of the scroll controller 404 at least in part by content on the web page currently presented in one or both of the vertical center of the display and/or the horizontal center of the display at the time of the identification. Accordingly, in the example shown the area of focus 414 is identified by the device (e.g., based in part on communication with the display to exchange information on the characteristics, dimensions, and/or various coordinates of the display) as being content (in this case, including the element 410) within a center-most horizontal section of the display when the scrolling occurs and/or ceases at the positioning shown in FIG. 4. However, it is to be understood that in other embodiments, the area of focus may be identified as being a center-most vertical section or may be identified as the overlapping portion of both a center-most horizontal section and a center-most vertical section. In any case, it is to also be understood that the height of the center-most horizontal section and/or the width of the center-most vertical section may be defined by a user and/or a system administrator e.g., by previously providing input to a UI such as the UI 800 to be described further below.

Regardless but still in reference to FIG. 4, as indicated above, an area of focus 416 may instead or additionally be identified based on the position of the cursor 408, such as by at least in part by identifying content (in this case, the element 410) presented within an area at least in part established by respective left, right, top and bottom bounds of the cursor 408, or established by the respective bounds and an additional threshold amount of area beyond the respective bounds, such as an additional number of pixels and/or other units of measurement (e.g., millimeters, inches, etc.) in each direction beyond each respective bounds for the cursor 408 (e.g., where the additional number of may be defined based on user input, based on input from an administrator and/or manufacturer of the device, and/or dynamically by the device based on a level of device confidence in identifying the user's area of focus based on the cursor position).

In addition to or in lieu of the foregoing, the area of focus 416 may be identified based on the position of the cursor 408 at least in part by identifying a selectable portion of content (in this case, the element 410) over which at least to portion of the cursor 408 is positioned and/or by identifying text over which at least a portion of the cursor 408 is positioned (e.g., and ignoring other things such as background color and/or patterns also presented thereat). In the case of text, the area of focus 416 may be determined to be content of a particular prose increment including the text over which at least a portion of the cursor 408 is positioned, such as a sentence clause, a sentence, a paragraph, or a document section.

Furthermore, as also indicated above, in some embodiments one of the current scroll position and the current cursor position may be used, but in ether embodiments both may be used to identify content as being the area of focus such as when the level of device confidence in determining the content being focused on is increased by using both of the current scroll position and the current cursor position. However, it is to also be understood that where the device attempts to identify the area of focus based on both of the current scroll position and the current cursor position but where the areas do not share common content and/or her the areas do not overlap owing to the cursor being positioned over an area that is not, e.g., centrally-disposed, one of the current scroll position or the cursor position may be used to identify the area of focus based on, e.g., user preference of which to use over the other when there is a conflict and/or where there is no overlap (e.g., as input to a UI such as the UI 800 to be described below).

For instance, suppose a user configures settings for the device to use both current scroll position and current cursor position to identify an area of focus, but also suppose that thereafter the user launches an Internet browser application and begins reading text in a bottom right portion of the display over which the user positions the cursor and which was made visible based on the user scrolling down a bit while content for the website continues to load. In this case, there would be a conflict over what to identify as the area of focus—the text in the bottom right portion over which the cursor has been positioned or different content shown in a different location at the center-most horizontal section of the display. Based on an area of focus identification method priority and/or ranking established by the user, the device may resolve the conflict by identifying the area of focus as the text over which the cursor is juxtaposed.

Figure 5:
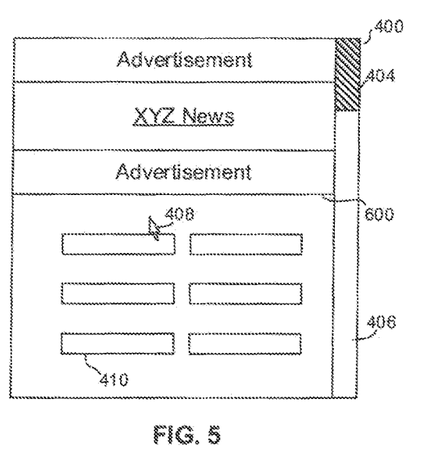

Moving on to FIG. 5, it shows the website XYZ News after all content has been loaded. However, it is to be understood that FIG. 5 shows what may occur should the device not identify the area being focused on while content was loaded. FIG. 5 thus shows the scroll controller 404 at the top of the scroll bar 406 and accordingly a top-most portion of the website XYZ News being presented. Note that the position of the cursor 408 has not changed relative to its positioning when the content was being loaded as shown in FIG. 4. However, the element 410 is now presented at a different location than it was while the content was being loaded, and hence the user would have to search the page to locate it again.

Figure 6:
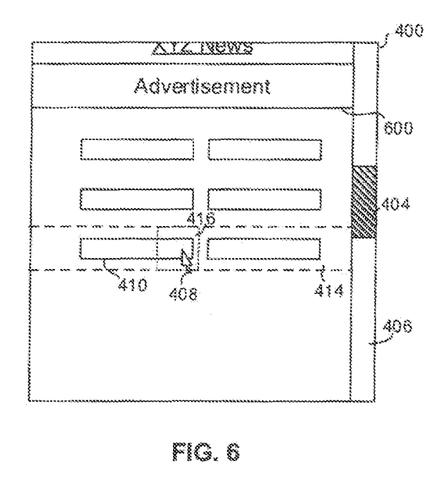

Therefore, rather than the user having to again search for the element 410, the user may begin viewing the selector element 410 as shown in FIG. 4 while content continues to load and they a device undertaking present principles may, responsive to content continuing to load and/or responsive to all content being loaded, present the website XYZ News as shown in FIG. 6 rather than as shown in FIG. 5.

As shown in FIG. 6, advertisement 600 has been loaded where the indication 402 used to be. Owing to the additional space the advertisement 600 occupies relative to the indication 402, there is now more content between the top of the website and the selector element 410 than as shown in FIG. 4. The device has thus controlled the scroll position of the scroll controller 404 so that, notwithstanding the additional content being loaded above the element 410 after the user began focusing on the element 410, the areas 414 and 416 as still presented as the same location on the display as they were as shown in FIG. 4 so that area of focus continues to be presented at the same position so that the user may continue to view it uninterrupted at the same location after all content loads, such as without having to provide additional input after all content loads to scroll hack to that area if it was removed from presentation on the display slier all content was loaded.

Continuing to present the area of focus at the same position as content continues to load also permits a user to provide input to select the element 410 without having the element 410 be repositioned on the display or removed from the display between the time when the user decides to provide the input and the time at which the input is actually provided owing to content continuing to load, where that repositioning may otherwise inadvertently cause the input to be directed, to another portion of the website that gets displayed at the area in place of the element 410 that has "jumped" to a new location even though the input was intended to be directed to the element 410. Thus, as may be appreciated from FIG. 6, the scroll controller 404 is juxtaposed relatively lower on the scroll bar 406 than it was as shown in FIG. 4 owing to the content 600 being loaded so that the areas 414 and 416 are still presented at least substantially at the same location as they were before by controlling the position of the controller 404 and hence the portion of the website presented on the display.

Figure 7:
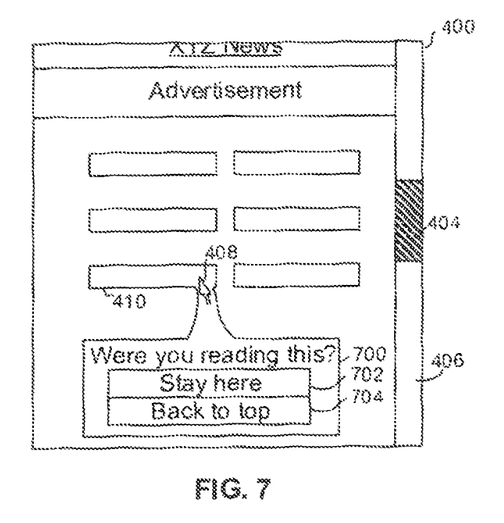

Now describing FIG. 7, the website XYZ News is again shown with all content downloaded and the area of ideas still presented as the same display location as it was previously when content was still being loaded (as was shown in FIG. 4). FIG. 7 demonstrates that after the area of focus has been identified while content is being loaded, responsive to all content being loaded, and with the area of focus still being presented at the particular display location, a prompt 700 may be provided to the user requesting confirmation that the user is viewing the identified area of focus. Such a prompt may be provided, e.g., if a user has not preconfigured the device for continuing to present areas of focus at the same display location once all content loads.

In any case, the prompt 700 asks whether the user was viewing an hem on the website indicated in the prompt 700 (in this case, indicated visually owing to the terminating point of the bubble establishing the prompt 700 as being presented at or proximate to the element 410). A selector element 702 is presented on the prompt 700 which is selectable to automatically without further user input continue presenting the element 410 at the same display location despite all content for the website XYZ News being loaded. Selector element 704 is also presented on the prompt 700 and is selectable to automatically without further user input present a top-most portion, of the website XYZ News rather than the area of focus.

Although not shown in FIG. 7, it is to be understood that if the device determines that the user is looking at two possible areas but it cannot identify which one specifically, a prompt similar to the prompt 700 may be presented which indicates these two areas of focus and requests the user indicate which area is the one being looked at based on selection of either of two respective selector elements presented on the prompt. This input can then be used to continue presenting the selected area at the same display location as content continues to load.

Figure 8:
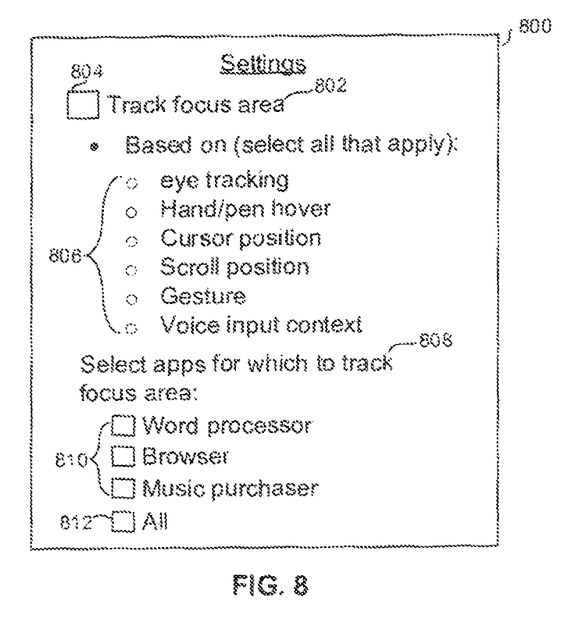

Continuing the detailed description in reference to FIG. 8, it shows an example UI 800 presentable on a device for configuring settings of a device for undertaking present principles. The UI 800 includes a first setting 802 for enabling tracking of an area of focus of a user in accordance with present principles so that the focus area may continue to be presented at least substantially at the same display location as other content loads and/or shifts, and/or once the other content completely loads or stops shifting. The first setting 802 may be enabled automatically without further user input responsive to selection of check box 804.

In some embodiments, the setting 802 may also include one or more options for enabling use of one or more particular methods of tracking and/or identifying the area of focus, which each option enabled by selecting its corresponding, respective radio button 800. The options may include enabling tracking and/or identification of the area of focus based on eye tracking, detection of an input device (e.g., stylus or electronic pen) and/or user as hovering over an area of the display, cursor position, scroll position, detection of a gesture(s) toward an area of the display, and/or determination of what area is being viewed based on voice input context (e.g., the user reading aloud words corresponding to text presented at a particular location as recognized by the device).

The UI 800 of FIG. 8 may also include a second setting 808 providing one or more options for a user to enable tracking and/or identification of a user's area of focus in accordance with present principles based on the particular application being used. Thus, corresponding check boxes 810 for each respective option are shown which are selectable to enable area of focus tracking and/or identification for the associated application. In the example shown, applications for which area of focus tracking and/or identification may be enabled include a word processing application, a browser application, and a music purchasing application. Furthermore, it is to be understood that in some embodiments, selecting the box 804 without also selecting one or more specific applications using setting 808 will enable tracking and/or identification of an area of focus for all applications and/or all contexts, while in other embodiments tracking and/or identification for all applications and/or contexts may be enabled automatically without further user input responsive to selection of the "all" check box 812.

It may now be appreciated that present principles provide for, e.g., detecting is potential touch selection, or another potential type of selection such as a mouse click, of an element presented at a location of a display before the selection is actually received using things such as a three dimensional camera, eye tracking, a Wacom digitizer, etc., and/or any combination thereof. Once display coordinates corresponding to the location on the display are determined, the content presented at that location may be kept at least substantially unmoved at that location while other portions of the document and/or page are loaded, shifted, and/or rendered so that user's focus may stay on the location and hence same content as content continues to load, shift, or be rendered. Thus, in one embodiment, if a is determined by the device that a user looks at text presented on the display, that text may be kept in the same spot on the display regardless of if the page "reflows" and/or regardless of receipt of other input from a user such as a touch on the display, a click a scrolling, etc. Furthermore, if the user looks away while a page is loading or shifting, the content determined to be looked at may be "remembered" (e.g., stored in a storage location such as RAM) as the page continues to load or shift and the viewed content may continue to be presented at that location while the user looks away so that it remains at that location when the user's focus returns to the display (e.g., until it is determined that other content is subsequently being looked at). Moreover, a user may provide hover input of their finger over a location on the display e.g. when reading the content presented thereat so that the hovering is used by the device as a marker of where the user is viewing text.

Content may continue to be presented at a display location as other portions load and/or shift by vertically and/or horizontally scrolling the page (e.g., continually, responsive to each piece of content being rendered and/or loaded, and/or at predetermined time increments such as every fiftieth of a second) as the other portions continue to load and/or shift (above and/or below the viewed content) so that the content appears in the sumac display location. Further still, if a user is reading something as identified by executing eye tracking software using images from a camera, and then the user collapses another section of the page (e.g., by selecting a minus symbol which collapses other content and/or otherwise removes it from presentation on the display), the page may scroll in response to the command to collapse to thus keep the last-viewed content in the same spot on the display despite the collapsing.

Before concluding, it is to be understood that although a software application for undertaking present principles may be vended with a device such as the system 100, present principles apply in instances where such all application is downloaded from a server to a device over a network such as the Internet. Furthermore, present principles apply in instances where such an application is included on a computer readable storage medium that is being vended and/or provided, were the computer readable storage medium is not a transitory signal and/or a signal per se.

While the particular CONTINUED PRESENTATION OF AREA OF FOCUS WHILE CONTENT LOADS is herein shown and described in detail, it is to be understood that the subject matter which is encompassed by the present application is limited only by the claims.

What is claimed is:

1. A device, comprising:
   at least one processor;
   a display accessible to the at least one processor; and
   storage accessible to the at least one processor and bearing instructions executable by the at least one processor to:
   identify an area of focus on a first user interface (UI) presented on the display while first content for the first UI is loading, wherein at least a portion of the first UI that comprises the area of focus is presented on the display at a first position while the first content is loading;
   in response to the identification, control the display to present the area of focus on the display at least substantially at the first position as a remainder of the first content finishes loading offscreen; and
   present a second UI on the display, the second UI being different from the first UI, the second UI being manipulable to configure at least one setting related to content presentation, the second UI comprising a first setting that is selectable to enable the device to control the display to present areas of focus on the display as remainders of content finish loading offscreen;

wherein the second UI comprises first and second options, wherein each of the first and second options is selectable to enable the device to control the display to present areas of focus on the display as remainders of content finish loading offscreen within a particular application that is associated with a selected one of the first and second options, the first and second options being associated with different particular applications.

2. The device of claim 1, wherein the instructions are executable to:
control the display to present the area of focus on the display at least substantially at the first position in response to the first content being fully loaded.

3. The device of claim 1, wherein at least substantially at the first position is at least one of: within a threshold number of pixels of at the first position, at a position in which at least a portion of the area of focus is presented at least at a portion of the first position as the remainder of the first content finishes loading offscreen.

4. The device of claim 2, wherein at least substantially at the first position is at a position in which at least a portion of the area of focus is presented at least at a portion of the first position in response to the first content being fully loaded.

5. The device of claim 2, wherein at least substantially at the first position is at the first position.

6. The device of claim 1, wherein the area of focus is less than an entire area of the first UI that is presented at the time of the identification.

7. The device of claim 1, wherein the at least a portion is the area of focus, and wherein the area of focus is substantially an entire portion of the first UI that is presented on the display.

8. The device of claim 1, comprising a camera accessible to the at least one processor, wherein the instructions are executable to:
perform an eye tracking operation at least in part based on input from the camera, wherein the area of focus is identified at least in part based on performance of the eye tracking operation.

9. The device of claim 1, wherein the instructions are executable to:
identify the area of focus on the first UI at least in part based on identification of a position of a cursor presented on the display, the position of the cursor identified as being presented at least at a portion of the first position.

10. The device of claim 1, wherein the instructions are executable to:
identify the area of focus on the first UI at least n part based on identification of at least one object as being at least proximate to the first position.

11. The device of claim 1, wherein being at least proximate to the first position comprises hovering at least substantially over the first position.

12. The device of claim 1, wherein the instructions are executable to:
identify the area of focus on the first UI at least in part based on a current scroll position of the first UI.

13. The device of claim 1, wherein the device comprises a camera accessible to the at least one processor, and wherein the instructions are executable to:
perform a gesture recognition operation at least in part based on input from the camera, wherein the area of focus is identified at least in part based on performance of the gesture recognition operation to identify a user as pointing with at least one finger at least toward the first position.

14. The device of claim 1, wherein the display is controlled to present the area of focus on the display at least substantially at the first position as the first content finishes loading offscreen at least in part by controlling a scroll position of the portion of the first UI to continue to be presented as the remainder of the first content finishes loading offscreen.

15. A method, comprising:
identifying, while first content for a first window is being accessed, a first portion of the first window being observed by a user, wherein the first portion of the first window is presented on a display;
based at least in part on the identifying, continuing to present the first portion on the display as at least a second portion of the first content finishes loading but is not presented on the display; and
presenting a second window on the display, the second window being different from the first window, the second window being manipulable to configure at least one setting related to content presentation; the second window comprising a first setting that is selectable to enable a device to control the display to continue to present, on the display, portions of content that are being observed as other portions of content finish loading but are not presented on the display;
wherein the second window comprises first and second options, wherein each of the first and second options is selectable to enable the device to control the display to continue to present portions of content that a being observed within a particular application that is associated with a selected one of the first and second options, the first and second options being associated with different particular applications.

16. The method of claim 15, wherein the method comprises:
in response to the identifying, presenting the first portion on the display subsequent to the first content finishing loading.

17. The method of claim 15, wherein the first portion of the first window is identified based at least in part on receipt of at least one command to scroll to the first portion of the first window from another portion of the first window that is presented while the first content s being accessed.

18. A computer readable storage medium (CRSM) that is not a transitory signal, the computer readable storage medium comprising instructions executable by a processor of a device to:
while first content is being accessed for presentation on a first user interface (UI) that is presented on a display, determine an area of the first UI presented on the display that is being viewed, the area comprising a first portion of the first content, the first portion of the first content not establishing a top-most portion of the first content;
at least in part based on the determination, present the area as at least a second portion of the first content finishes loading but is not presented on the display as it loads, the second portion of the first content being different from the first portion of the first content; and
present a second UI on the display, the second UI being different from the first UI, the second UI being manipulable to configure at least one setting related to content presentation, the second UI comprising a first setting that is selectable to enable the device to control the display to present areas on the display that are being viewed as content finishes loading;

wherein the second UI comprises first and second options, wherein each of the first and second options is selectable to enable the device to control the display to present areas on the display that are being viewed as content finishes loading within a particular application that is associated with a selected one of the first and second options, the first and second options being associated with different particular applications.

19. The device of claim 1, wherein the area of focus does not present a top-most portion of the first content.

20. The method of claim 15, wherein the first portion of the first window, while the identifying is being performed, does not present a top-most portion of the first content.

21. The method of claim 15, wherein the determination is based at least in part on voice input received at the device that indicates content presented at the first portion.

* * * * *